US009733785B2

United States Patent
Kapahi

(10) Patent No.: US 9,733,785 B2
(45) Date of Patent: Aug. 15, 2017

(54) FACILITATING TOUCH SCREEN USERS TO SELECT ELEMENTS IDENTIFIED IN A TWO DIMENSIONAL SPACE

(71) Applicant: Oracle International Corporation, Redwood Shores, CA (US)

(72) Inventor: Puneet Kapahi, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 254 days.

(21) Appl. No.: 14/097,261

(22) Filed: Dec. 5, 2013

(65) Prior Publication Data

US 2014/0380140 A1    Dec. 25, 2014

(30) Foreign Application Priority Data

Jun. 24, 2013  (IN) .......................... 2759/CHE/2013

(51) Int. Cl.
*G06F 3/0481* (2013.01)
*G06F 3/0488* (2013.01)

(52) U.S. Cl.
CPC .......... *G06F 3/0481* (2013.01); *G06F 3/0488* (2013.01)

(58) Field of Classification Search
CPC ..... G06F 3/0481; G06F 3/0488; G06F 17/246
See application file for complete search history.

(56) References Cited

U.S. PATENT DOCUMENTS

| | | | | |
|---|---|---|---|---|
| 2005/0035967 A1* | 2/2005 | Joffrain | ..................... | G06F 8/34 345/440 |
| 2009/0307587 A1* | 12/2009 | Kaneko | ................. | G06F 3/0486 715/700 |
| 2010/0214237 A1* | 8/2010 | Echeverri | .......... | G06F 3/04883 345/173 |
| 2012/0272186 A1* | 10/2012 | Kraut | .................... | G06F 3/0488 715/810 |
| 2012/0324329 A1* | 12/2012 | Ceponkus | ............. | G06F 3/0485 715/227 |
| 2013/0187948 A1* | 7/2013 | Yoshimoto | .......... | G06F 3/04883 345/629 |
| 2014/0012117 A1* | 1/2014 | Mensinger | ............... | A61B 5/72 600/365 |

* cited by examiner

*Primary Examiner* — Kevin L Young
*Assistant Examiner* — Seth A Silverman
(74) *Attorney, Agent, or Firm* — IPHORIZONS PLLC; Narendra Reddy Thappeta

(57) ABSTRACT

An aspect of the present disclosure facilitates a user of a touch screen to select elements identified in a two dimensional space. In an embodiment, a user first selects an element (first element) of such elements sent for display on a chart having two axis, with each dimension mapped to one of the two axis. The user then swipes in a direction. The direction is mapped to one of the two axis, that is more proximate angularly than the other (to the swipe direction). An element next to the first element, along the dimension corresponding to the mapped axis, is selected as the selected element. The chart is updated to reflect the new selection.

18 Claims, 11 Drawing Sheets

_US 9,733,785 B2_

FACILITATING TOUCH SCREEN USERS TO SELECT ELEMENTS IDENTIFIED IN A TWO DIMENSIONAL SPACE

PRIORITY CLAIM

The instant patent application is related to and claims priority from co-pending India Application entitled, "Facilitating Touch Screen Users To Select Elements Identified In A Two Dimensional Space", Application Number: 2759/CHE/2013, filed on: 24 Jun. 2013, First Named Inventor: Puneet Kapahi, which is incorporated in its entirety herewith.

RELATED APPLICATIONS

The instant patent application is related to the subject matter of the following patent applications, which are all herewith incorporated in their entirety to the extent not inconsistent with the disclosure of the instant patent application:

1. entitled, "Displaying Tooltips To Users Of Touch Screens", Application Number: Unassigned, filed on: HEREWITH, First Named Inventor: Puneet Kapahi;

2. entitled, "Supporting Navigation On Touch Screens Displaying Elements Organized In A Fixed Number Of Dimensions", Application Number: UNNASSIGNED, filed on: HEREWITH, First Named Inventor: Puneet Kapahi;

3. entitled, "Facilitating Touch Screen Users To Select Elements In A Densely Populated Display", Application Number: UNNASSIGNED, filed on: HEREWITH, First Named Inventor: Puneet Kapahi; and 4. entitled, "Displaying Interactive Charts On Devices With Limited Resources", Application Number: UNNASSIGNED, filed on: HEREWITH, First Named Inventor: Puneet Kapahi.

BACKGROUND OF THE DISCLOSURE

Technical Field

The present disclosure relates to touch screen based systems, and more specifically to facilitating touch screen users to select elements identified in a two dimensional space.

Related Art

A touch screen refers to a display screen, which responds to touch based operations (e.g., touch/tap, drag, swipe, pinch) of users using one or more fingers, stylus, etc., and facilitates user interfaces with applications based on the operations.

The displays on touch screens often contain various elements. An element refers to a distinct entity (e.g., an icon, hyperlink, graphics element, etc.) that is usually visually demarcated by appropriate visual attribute (e.g., color, texture, border lines) on the display.

Displays are often populated with elements identified in a two dimensional space. A two dimensional matrix, with each entry at the intersection of a row and a column, being one of the elements, is an example of such elements. However, elements can be identified in two dimensional space, without such clear correlation in display. An example of such a display is a stacked bar graph, in which the same measures (e.g., profits from 3 different segments in one dimension) are displayed for multiple time points (e.g., annually for several years).

Users often wish to select one of the elements identified in a two dimensional space. In one approach, a user is expected to touch/tap an area, and a central point (touch or tap point) of the touch is determined. If the touch point does not fall on one of the elements, no element is selected and thus user may be required to touch different areas to cause selection of the desired displayed element. Often the zoom function is used in combination, to simplify the selection.

It is generally desirable that the selection of a desired element be simplified for users of touch screens.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure facilitates a user of a touch screen to select elements identified in a two dimensional space. In an embodiment, a user first selects an element (first element) of such elements sent for display on a chart having two axis, with each dimension mapped to one of the two axis. The user then swipes in a direction. The direction is mapped to one of the two axis, that is more proximate angularly than the other (to the swipe direction). An element next to the first element, along the dimension corresponding to the mapped axis, is selected as the selected element. The chart is updated to reflect the new selection.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
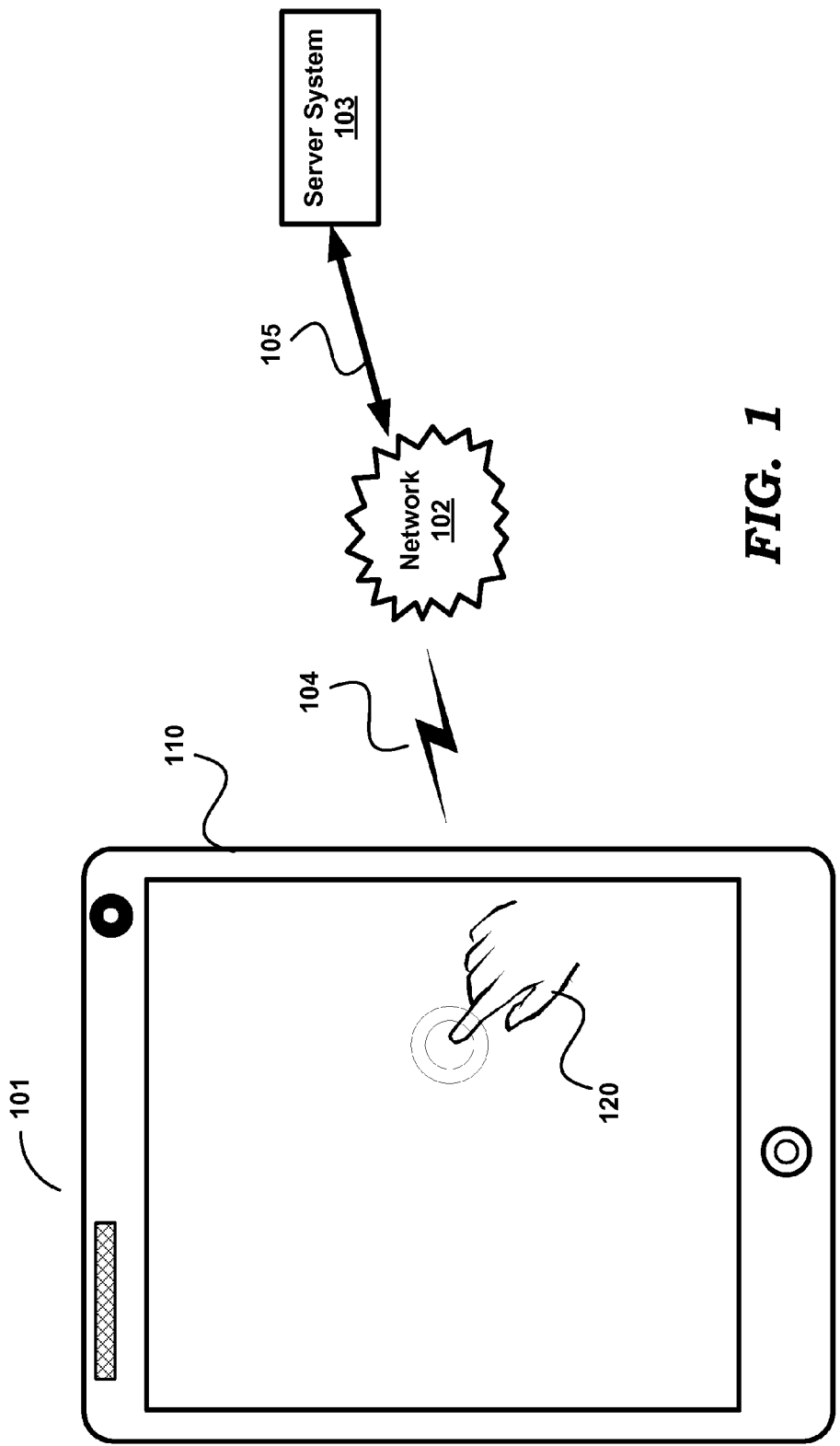
FIG. 1 is a block diagram illustrating an example computing system in which several aspects of the present disclosure can be implemented.

FIG. 1 is a block diagram illustrating the details of an example environment in which several features of the present disclosure can be implemented. The environment is shown containing touch system 101, network 102, and server system 103. Each block is described below in further detail.

Network 102 provides connectivity between touch system 101 and server system 103. Merely for illustration, touch system is shown communicating over wireless path 104, and server system 103 using a wire-based path 105. However, each system 101/103 can have the ability to communicate based on wireless and/or wire-based paths.

Server system 103 implements various applications that form the basis for interaction with touch system 101. Server system 103 may send data to touch system 101, representing various elements, to facilitate such interaction. Tool tip information corresponding to such elements may also be sent as a part of such data.

Touch system 101 provides user interfaces based on touch screens. Touch system 101 may implement either stand-alone applications or networked applications (i.e., as a client side complementing the server side implementation on server system 103). The networked applications can be as simple as a web browser (with appropriate plug-ins) or a custom application such as a mobile application. Touch system 101 may for example correspond to a personal digital assistant (PDA), a mobile phone, etc. A user is shown performing a touch operation on touch screen 110 using finger 120. As noted above, touch operations can be performed using one or more fingers, stylus, etc.

Touch screen 110 is used for displaying various elements. An element is represented by a portion of a display, visually identifiable as a separate entity in its display context. Examples of elements include various graphical icons, interface elements (buttons, scrollbars, etc.), etc, normally generated by the operation of various user applications (e.g., word processors, spread sheets, custom business applications, etc.) or shared utilities (e.g., operating system).

It may be desirable to facilitate users to select elements in such touch based display screens. Aspects of the present disclosure overcome at least some of the problems/requirements noted above, as described below with examples.

3. Facilitating Selection of Elements

Figure 2A:
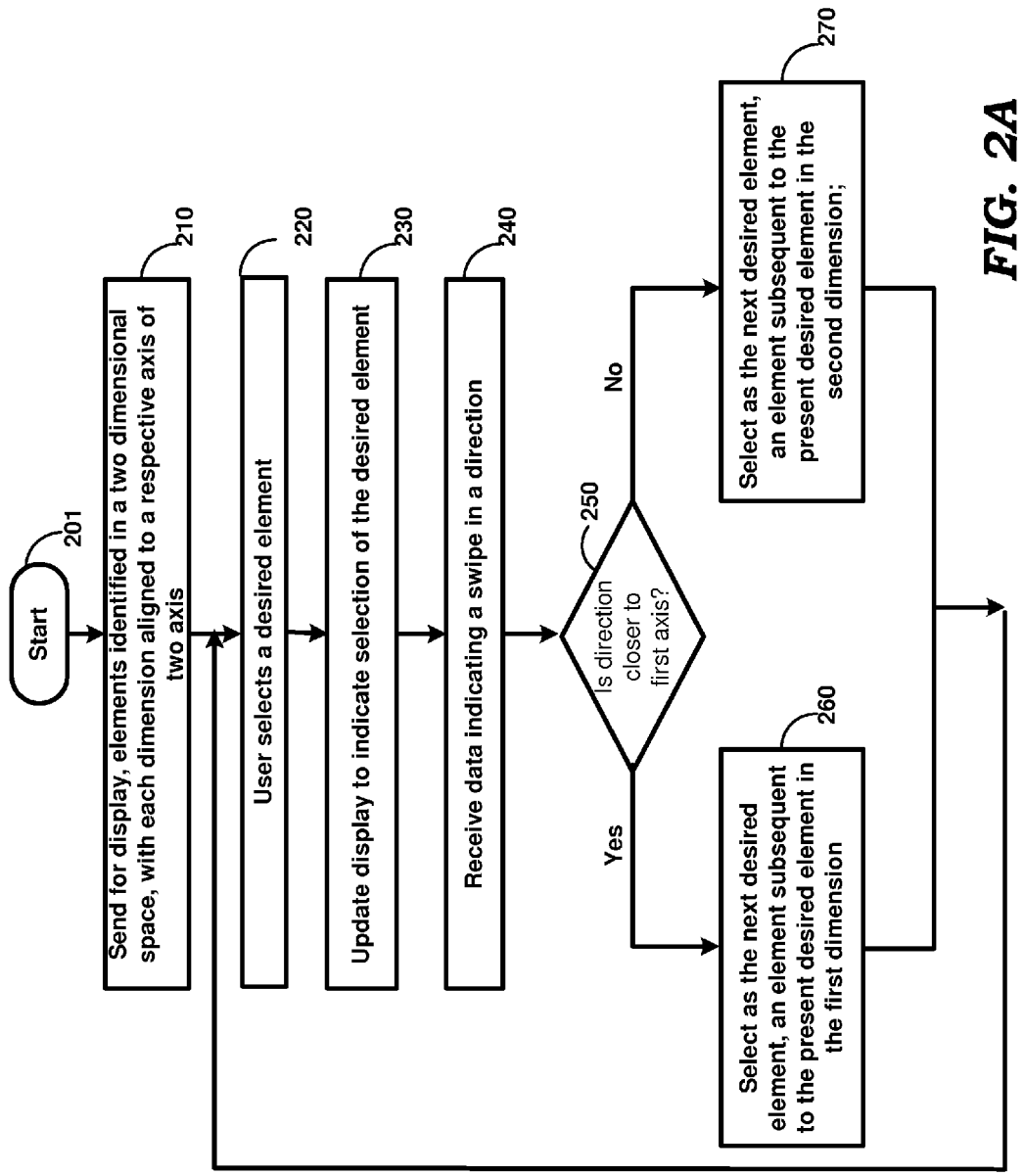
FIG. 2A is a flow chart illustrating the manner in which a touch screen based system permits selection of desired elements in an embodiment.

FIG. 2 is a flow chart illustrating the manner in which elements may be selected according to an aspect of the present disclosure. Each step is assumed to be performed in touch system 101 of FIG. 1 for illustration. However, at least some of the steps may be performed in server system 103 (or other systems, not shown) as well.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, elements are sent for display, with the elements being identified in a two dimensional space. Each dimension may be aligned to a respective axis of two axis on a display screen. The two axis together represent a graph, though aspects of the present disclosure can be implemented with various other charts.

In step 220, data indicating that a user has selected a (desired) element is received. For example, the received data may indicate an area of touch or a point of tap (depending on the implementation of the combination of the hardware and software), based on which one of the displayed element may be determined to be a selected element.

In step 230, the display is updated to indicate selection of the desired element. Such updating may be performed by sending all the elements again for display, or refreshing only the portions of the display that are changed in view of the selection of the element.

In step 240, data is received indicating a swipe in a direction. The data may be received consistent with conventions employed by appropriate combination of hardware, firmware and software. For example, the received data may indicate each point of contact forming the basis for the swipe or the received data may expressly represent a vector, etc.

In step 250, a determination is made as to whether the swipe direction is closer to first axis or second axis. For example, the angular distance of the swipe direction from each of the two axis may be determined, assuming the swipe can be modeled as a straight line. Control passes to step 260 if the swap direction is closer to the first axis and to step 270 otherwise.

In step 260, an element subsequent to the present desired element in the first dimension, is selected as the next desired element.

In step 270, an element subsequent to the present desired element in the second dimension, is selected as the next desired element. Steps 230-270 are performed for each subsequent selection, to facilitate a user to navigate across various successive elements of interest.

Figure 2B:
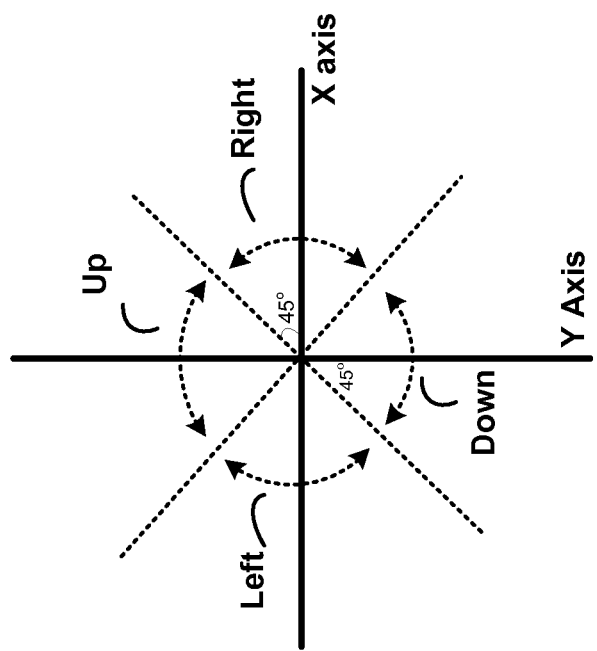
FIG. 2B is a diagram illustrating the manner in which the swipe direction determines the next desired element (relative to a presently selected element) in an embodiment.

As depicted in FIG. 2B, a swipe at an angle in the range of 315-45, 45-135, 135-225, 225-315 degrees is respectively determined to be horizontal-right, vertical-up, horizontal-left, and vertical-down directions, for the purpose of selection of the next desired element.

Thus, the knowledge of relation between elements along the two dimensions is used to constrain navigation only along one of the corresponding dimension/axis for each swipe, even if the swipe substantially deviates from that of horizontal and vertical axes.

As a result, the user has predictability to change selection since he is only permitted to change selection to subsequent element along the dimension of interest by swiping in the approximate direction of the corresponding axis. The ability to navigate across related elements is accordingly simplified.

The above noted approaches and some other features of the present disclosure are illustrated below with respect to various examples.

4. Examples

FIGS. 3A-3E represent respective displays on touch screen 110 at corresponding time instances, and illustrates some of the features of the present disclosure, as described below.

Figure 3A:
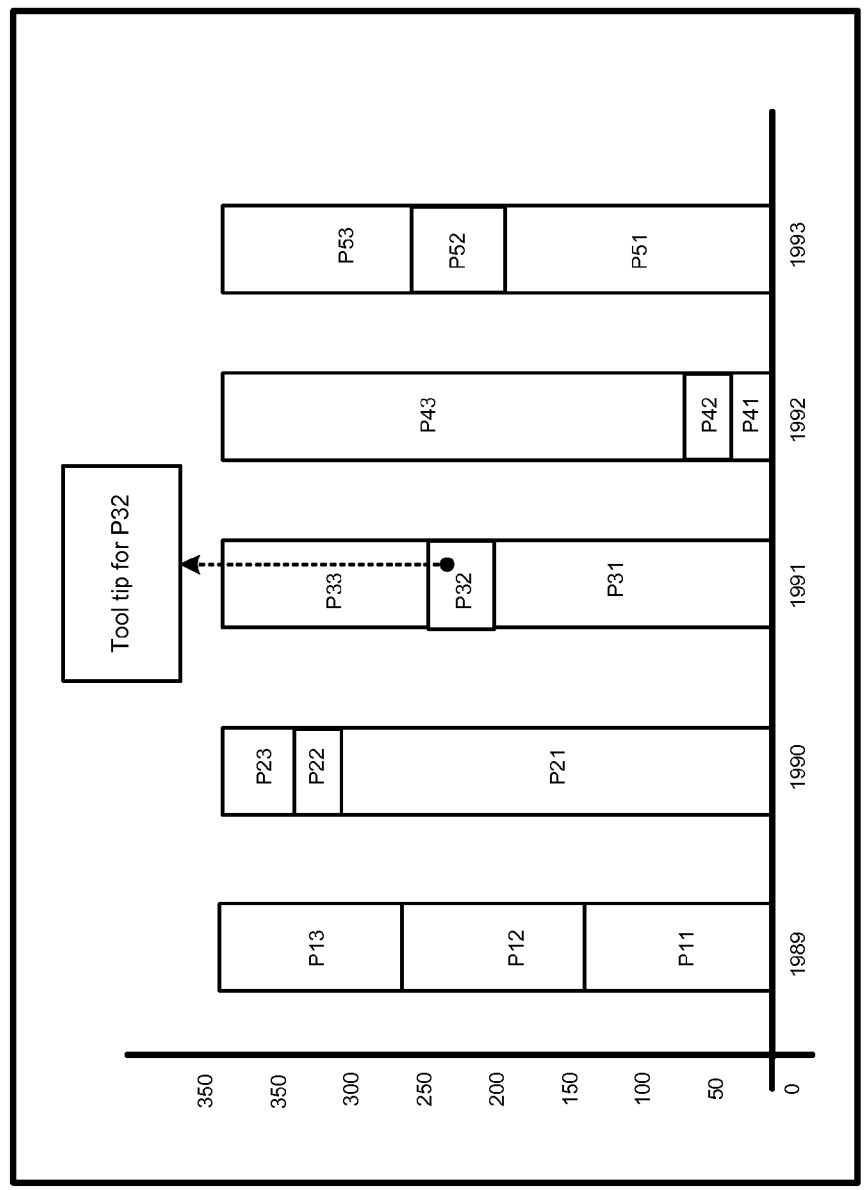
FIGS. 3A-3E represent respective displays on a touch screen illustrating the selection and display of tooltip information
Figure 3B:
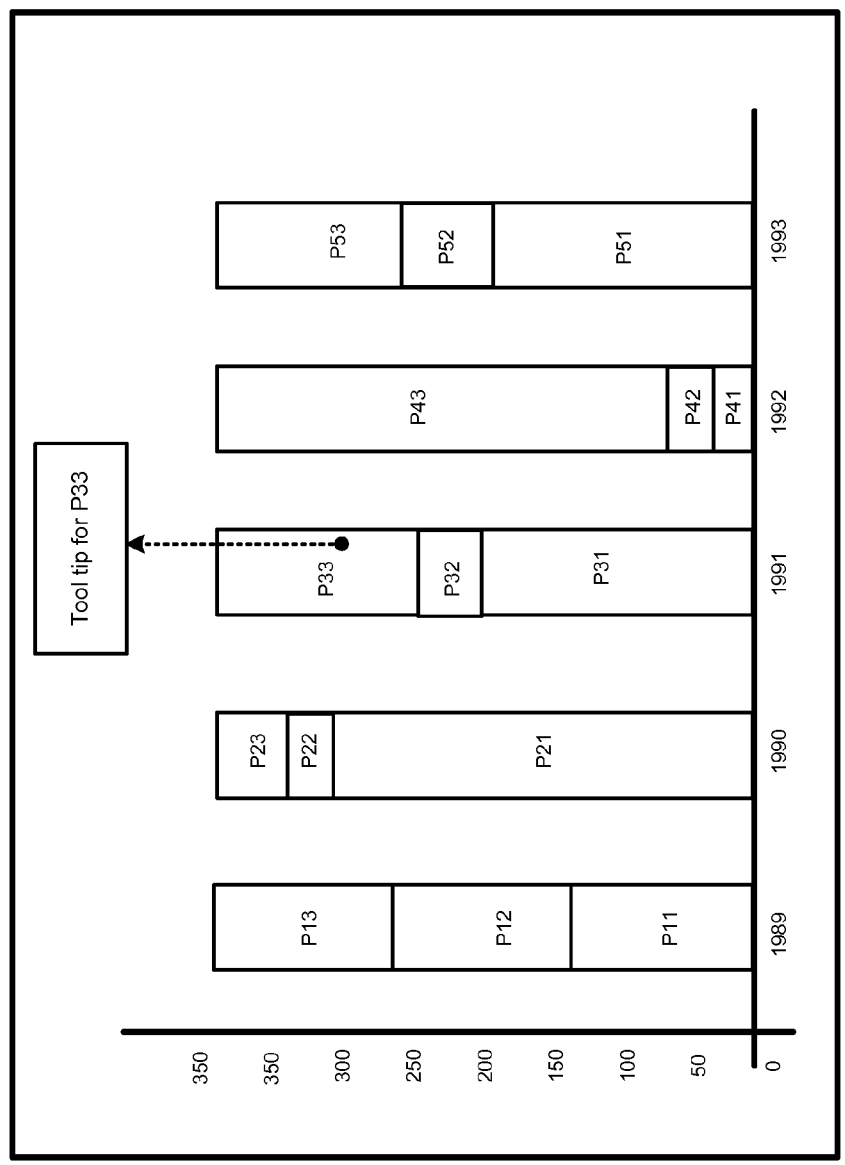
Figure 3C:
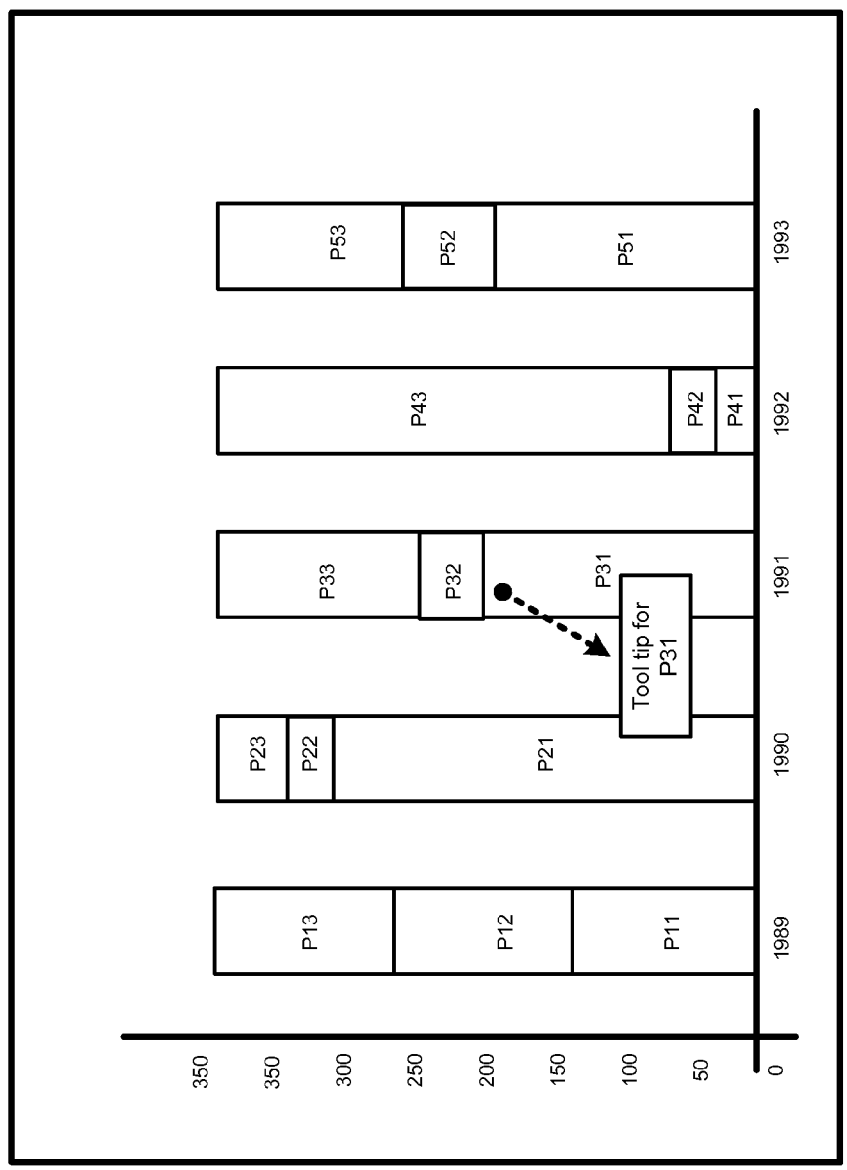

FIG. 3A depicts the display (on touch screen 110) containing various elements identified in a two dimensional space. There are shown profits (one dimension) from three different segments on Y-axis, and such information is shown for five years (second dimension). The 15 corresponding elements are referred to as P11 . . . P53 (with the first suffix representing the year dimension and the second suffix representing the profit dimension). The Figure is shown having selected the profit based on segment 2 for year 1991 (P32).

FIGS. 3B, 3C, 3D, 3E respectively show the corresponding change of display after a user has swiped in one up, down, right and left directions (in accordance with the description of FIG. 2B above. The swipe can be using the tooltip box (i.e., dragging the box) of FIG. 3A or in any area (including the blank areas). Up/Down directions indicate desire to continue selection for the same year, but of segment 3/1 (adjacent or next segment). The left/right directions indicate desire to continue selection for the same segment, but for previous/subsequent (in general, next) year.

Thus, assuming that a user has swiped on the display corresponding to FIG. 3A, at angle between 315-45 degrees, the user is deemed to have expressed interest in profit for the same second segment, but for a subsequent year. Accordingly, the display of FIG. 3D shows the selection having changed to the profit corresponding to next year 1992, but for the same segment S2.

Figure 3D:
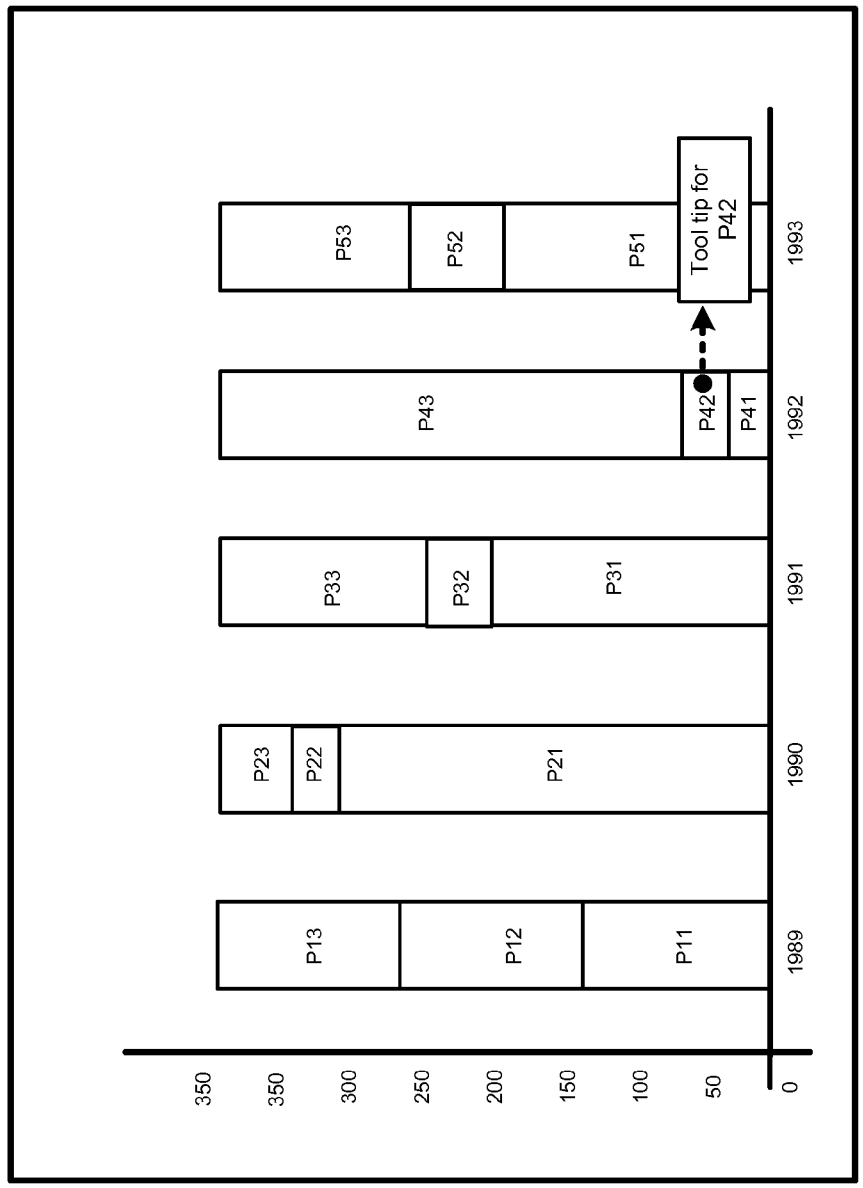
Figure 3E:
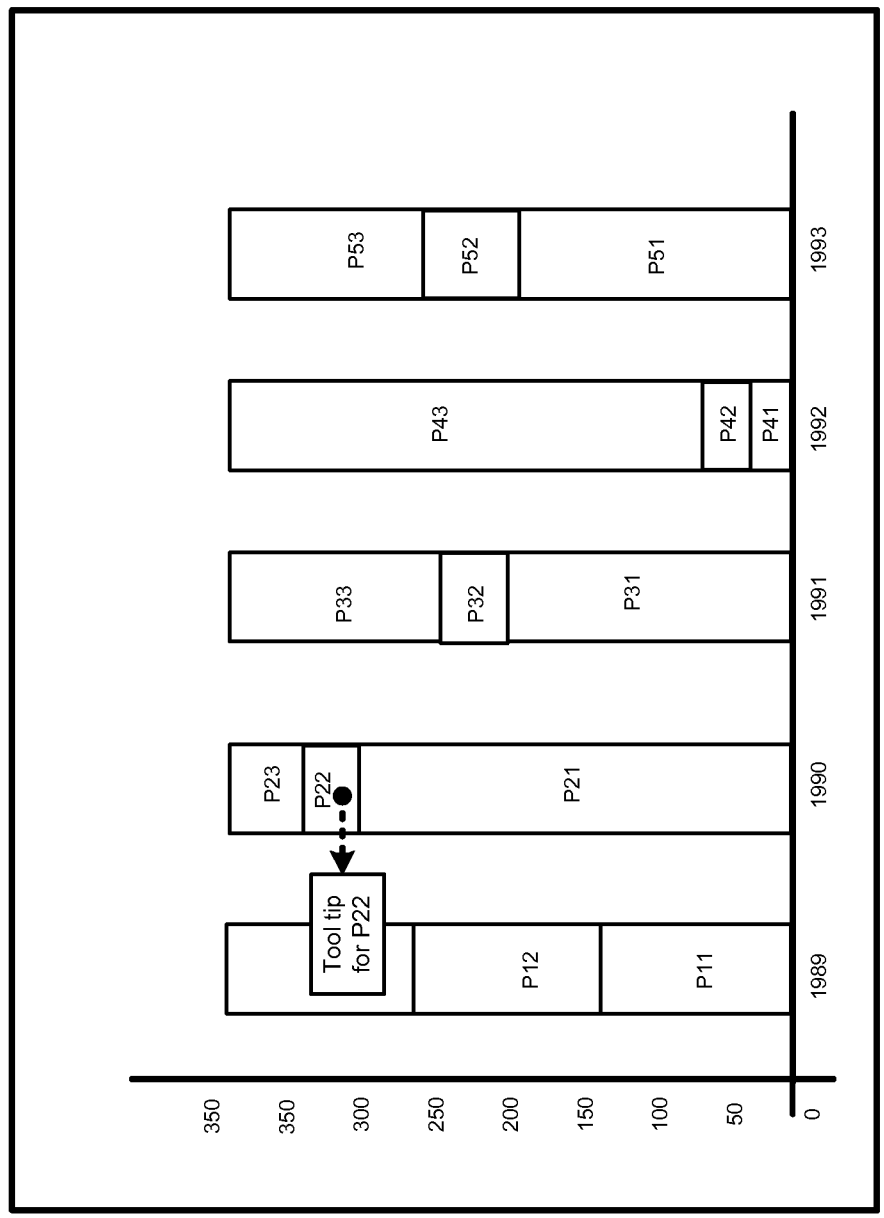

It may be appreciated that P42 is selected on a right swipe (as shown in FIG. 3D), even though P43 is shown to be closer towards the right of P32. Similarly, P22 is selected on a left swipe (as shown in FIG. 3E), even though P21 is shown closer towards the left of P32.

In one embodiment, it may thus be appreciated that the user is unable to reach any of the other (i.e., except the four noted above) elements from FIG. 3A based on a single swipe operation irrespective of speed or distance/length of the swipe. In an alternative embodiment, the speed of swipe determines the number of elements jumped in the same direction. Thus a faster right swipe, may cause element P52 to be selected (instead of P42 for a normal right swipe).

It may be accordingly appreciated that the user is able to navigate only along the dimensions/axis in both the embodiments. Such a constraint offers more predictability in selection of elements, and can be particularly useful in densely populated segments.

Furthermore, the tool tip persists even after a user lifts her/his finger from first selection of FIG. 3A (if the swipe is to be based on dragging the tooltip box). Irrespective, the selection of an element may persist once a user selects the element.

The description is continued with respect to the manner in which touch system 101 can be implemented in several embodiments.

5. Touch System

Figure 4:
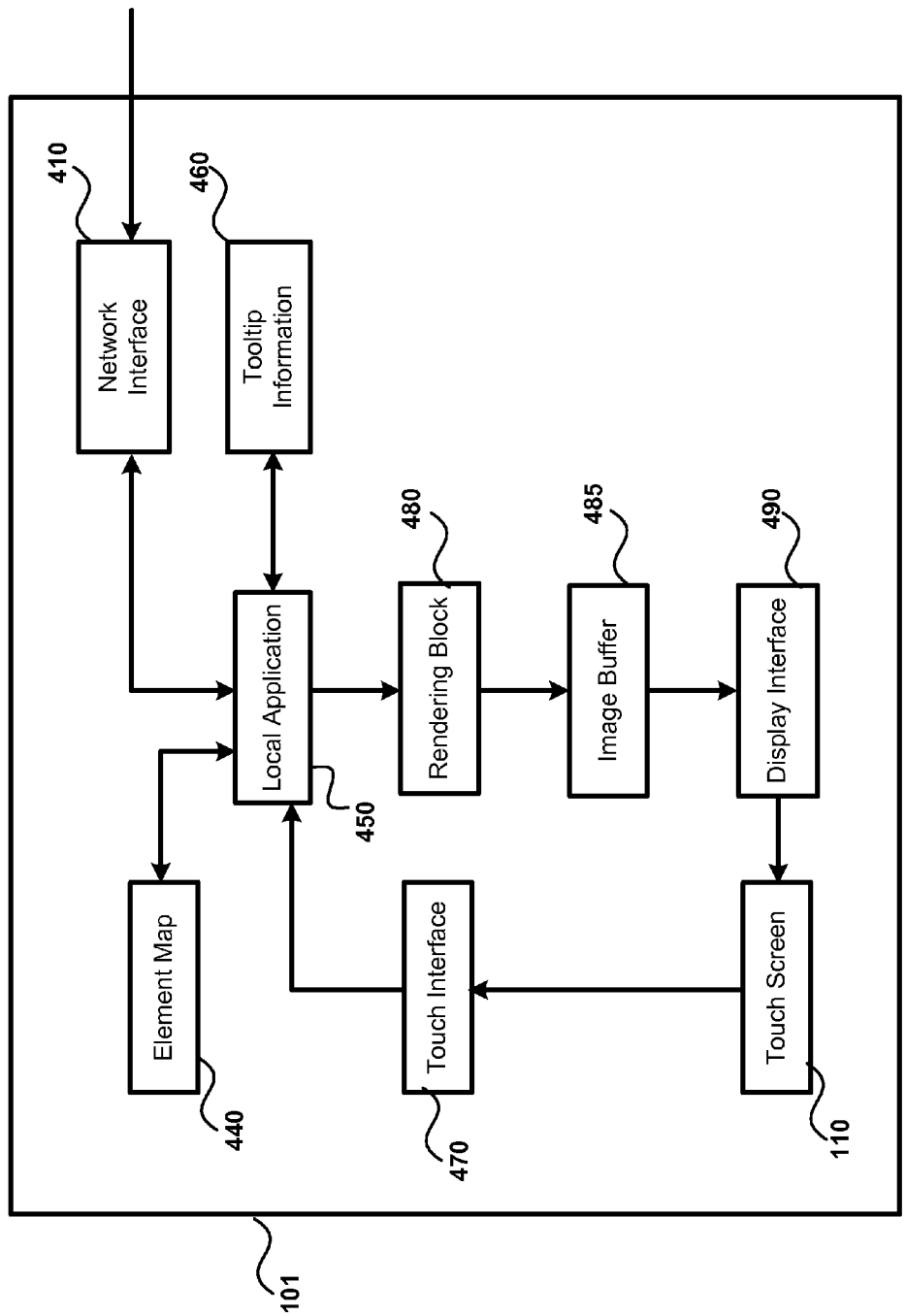
FIG. 4 is a block diagram illustrating the details of a digital processing system in an embodiment.

FIG. 4 is a block diagram illustrating the details of touch system 101 in an embodiment. Touch system is shown containing network interface 410, local application 450, tooltip information 460, touch interface 470, rendering block 480, image buffer 485, and display interface 490.

Network interface 410 provides the connectivity with server system 103 to receive data representing various elements and any corresponding tooltip information (for networked applications). The received data is provided to local application 450. In case of stand-alone application such information may be integral to the application being executed.

Touch interface 470 provides information characterizing various touch operations on touch screen 110. For example, the received data may indicate whether a single point/area was touched, multiple were touched simultaneously, and the coordinates of such one or more touches. The data thus received forms the basis for determining whether a user has intended a single touch/tap, drag, pinch, etc., touch operations on touch screen 110. In an embodiment, for each touch/tap operation, coordinate data representing a centre point of the touch (touch point) is provided.

Element map 440 represents the various elements that are displayed on touch screen 110, and the corresponding locations/area covered by the element. Each element may be identified by a corresponding data point. Tooltip information 460 contains the respective text/information to be provided associated with any/each element that is received from server system 103.

Rendering block 480 may receive the list of elements to be displayed (e.g., characterized by shape and relevant attributes to define the complete image for the element), the corresponding area that each element is to cover on the display screen, etc., and generate a composite image of all the elements. The composite image (e.g., in RGB format) is stored in image buffer 485. Display interface 490 generates display signals which cause the corresponding image to be displayed on touch screen 110. Touch interface 470, rendering block 480, image buffer 485, display interface 490 and touch screen 110 may be implemented in a known way.

Local application 450 represents a client side portion of a networked application (e.g., browser) or a stand-alone application. In case of standalone application, the elements and corresponding information may be formed/created locally upon execution of the corresponding instructions. In case of networked applications, data corresponding to various elements is received from server system 103 via network interface 410. Local application 450 processes the data and populates element map and tooltip information 460 based on the received information.

Based on the elements populated in element map 430, local application 450 then sends a list of elements to rendering block 480, which causes the corresponding display to be generated on touch screen 110 based on the operation of image buffer 485 and display interface 490 described above. The user can then select any desired element by touching the corresponding element.

Upon receiving indication of a touch/tap operation (e.g., with the centre of the touch area received as a parameter value), local application 450 first determines the specific one of the elements in element map 440, which has a display area overlapping with the tap point received as a parameter (upon touch operation). Assuming such an element is found, the corresponding element is determined as the desired/selected element (step 220).

Local application 450 forms another element (or elements) representing the leader line and tooltip box upon selection of an element. The tooltip corresponding to the selected element is retrieved from tooltip information 460, and incorporated into the tooltip box. The leader line is defined to point to the element selected by the user. The list of elements in element map 440 along with the newly formed leader line and tooltip box elements are sent for display to cause the display of FIG. 3A to be generated. Local application 450 may maintain a local data (for example, in a volatile memory) indicating the details of the selected element (such as, the index of the element in element map 440) and thereafter update the local data based on the subsequent touch operations.

The user may alter the element selection again in accordance with FIGS. 2 and 3B-3E. In other words, the user may be constrained to change selection across the two dimensions only. Once a new/next element is selected, local application 450 retrieves the tooltip information 460 corresponding to the selected element from tooltip information 460, and incorporates the retrieved information into the tooltip box. The local data and display on touch screen 110 are accordingly updated (FIGS. 3B-3E), for the tool tip to map to the newly selected element. Thus, the user may be permitted to select desired elements successively.

One challenge in supporting navigation across different elements is that it may be desirable that any limitations with accessing the data related to (and defining) the various elements be adequately addressed. An aspect of the present disclosure addresses such potential limitations, as described below with examples.

6. Accessing Elements

Figure 5:
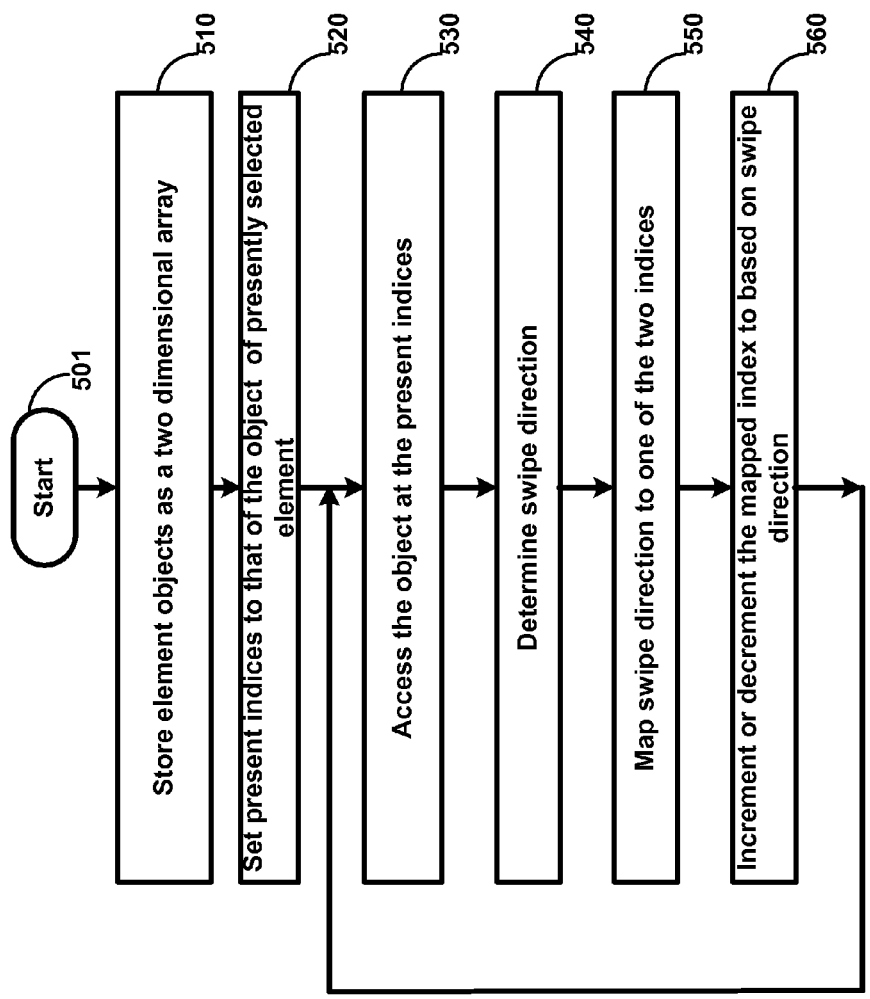
FIG. 5 is a flow chart illustrating the manner in which information related to elements is accessed in an embodiment.

In an embodiment, the information related to each element is organized in the form of an object (e.g., in Java Programming Language). The information may include, without limitation, the shape, size location, tool tip information, etc. The manner in which such objects may be accessed according to an aspect of the present disclosure is described below in further detail with respect to FIG. 5. Again, each step is assumed to be performed in touch system 101 of FIG. 1 for illustration. However, at least some of the steps may be performed in server system 103 (or other systems, not shown) as well.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 501, in which control immediately passes to step 510.

In step 510, local application 450 stores element objects of various elements as a two dimensional array. Thus, each entry of an array is addressable by two indexes, one for each dimension. Accordingly, the objects corresponding to elements P11 to P53 of above may be viewed as an array (Objects) of (5×3) size. It may be appreciated that the two dimensional array may constitute the combination of element map 440 and tooltip information, i.e., attributes such as shape, size and location, in addition to the tooltip information, of the corresponding objection may be stored as a part of the corresponding object.

In step 520, local application 450 sets present indices (I, J) to that of the object of presently selected element. Thus for the selection corresponding to FIG. 3A, I and J are respectively set to 3 and 2.

In step 530, local application 450 accesses the object at the present indices (i.e., present value of I and J respectively), i.e., objects (3, 2) is accessed.

In step 540, local application 450 determines swipe direction, as one of four possibilities—up, down, right and left, as explained above with respect to FIG. 2B. Thus, left and right represent decrease and increase along X-axis. Similarly, up and down represent increase and decrease along Y-axis Steps 550 and 560 operate to increment or decrement one of the two indexes. Thus, up implies incrementing J, down implies decrementing J, left implies decrementing I, and right implies incrementing I. The four scenarios are described above with respect to FIGS. 3B-3E above. Control then passes to step 530, which operates to access the object at (I, J), with the changed value. It should be appreciated that the increment/decrement magnitude can be by 1 or larger magnitude, in accordance with the desired navigation experience.

It should be further appreciated that the features described above can be implemented in various embodiments as a desired combination of one or more of hardware, software, and firmware. The description is continued with respect to an embodiment in which various features are operative when the software instructions described above are executed.

7. Digital Processing System

Figure 6:
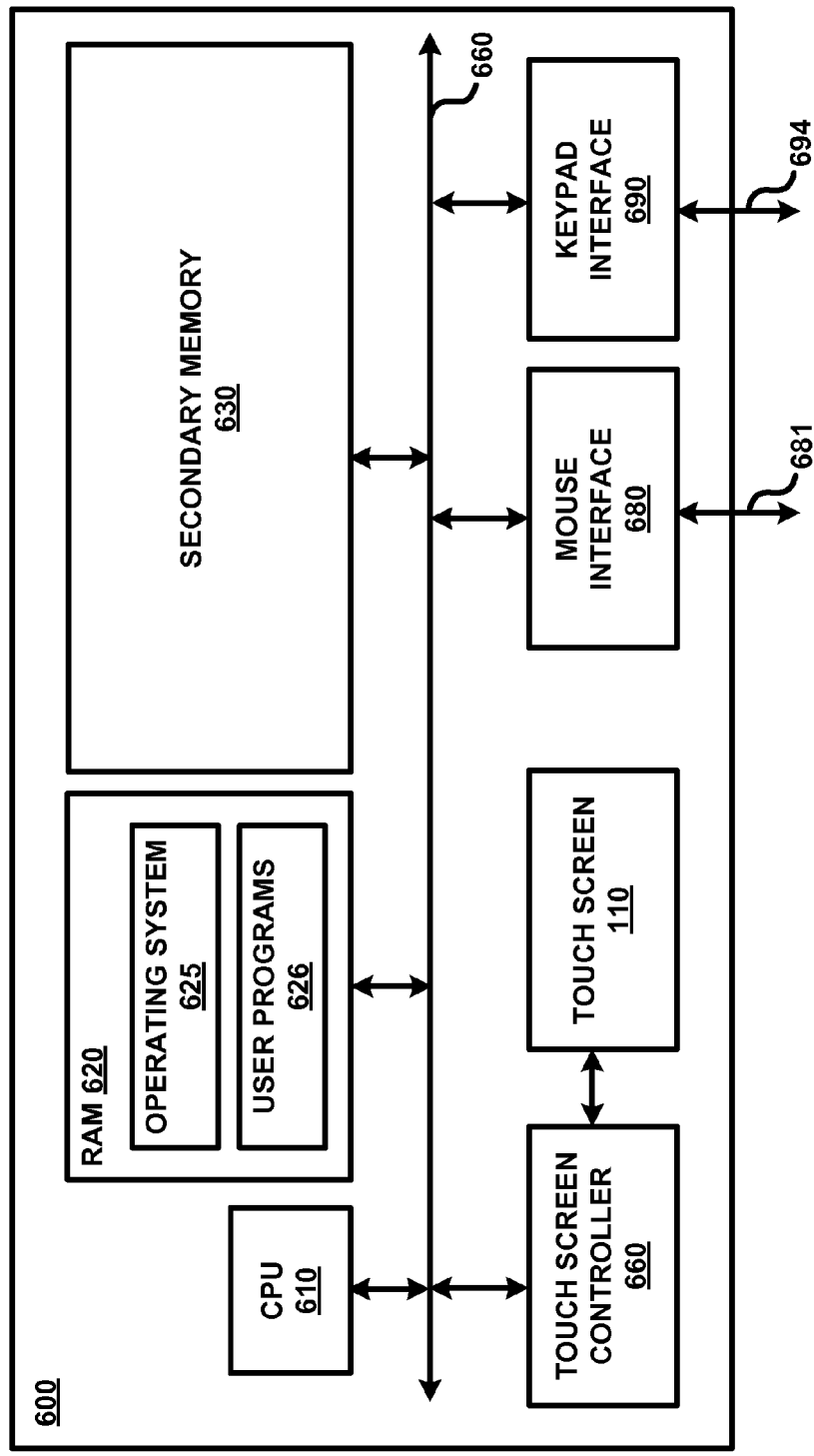
FIG. 6 is a block diagram illustrating the details of a digital processing system in which various aspects of the present disclosure are operative by execution of appropriate software instructions.

FIG. 6 is a block diagram illustrating the details of an example special purpose computing system in which several aspects of the present disclosure can be implemented. Special purpose computing system (System) 600 (corresponding to touch system 101) is shown containing central processing unit (CPU) 610, random access memory (RAM) 620, secondary memory 630, touch screen controller 660, touch screen 110, mouse interface 680 and keypad interface 690. All the components except touch screen 110 may communicate with each other over communication path 660, which may contain several buses as is well known in the relevant arts.

CPU 610 may execute instructions stored in RAM 620 to provide various features of system 600. Thus, for example, when system 600 corresponds to a PDA, the operation of CPU 610 may enable a user to use one or more of many user applications stored in the PDA and executable by CPU 610. The applications may include, for example, word processors, web browsers, email client, data organizers such as address books, etc. CPU 610 may contain multiple processors, with each processor potentially being designed for a specific task. Alternatively, CPU 610 may contain only a single general-purpose processor. Such combination of one or more processors may be referred to as a processing unit.

RAM 620 may receive instructions from secondary memory 630 using communication path 660. RAM 620 is shown currently containing software instructions constituting shared environment (operating system) 625 and user programs 626. Shared environment 625 contains utilities shared by user programs 626, and such shared utilities include operating system, device drivers, etc., which provide a (common) run-time environment for execution of user programs/applications. User programs 626 may include applications such as word processing, email client, etc., (or local application 450, including storing of element map 440, and tooltip information 460) noted above. One or more of user programs 626 may be designed to interact with a user via a graphical user interface (GUI) presented on touch screen 110, described above with respect to FIGS. 3A-3E.

Secondary memory 630 represents a non-transitory machine readable storage medium, and may store data and software instructions (for example, for performing the steps of the flowchart of FIGS. 2/5, described below), which enables system 600 to provide several features in accordance with the present disclosure. Further, secondary memory 630 may store data representing the tooltip information, the information displayed in FIGS. 3A-3E etc. The code/instructions stored in secondary memory 630 may either be copied to RAM 620 prior to execution by CPU 610 for higher execution speeds, or may be directly executed by CPU 610.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 660. Transmission media can also take the form of acoustic or light waves, such as those generated during radio-wave and infra-red data communications.

Mouse interface 680 enables user-inputs to be provided to system 600 via a mouse (not shown) connected on path 681. Keypad interface 690 is connected to a keypad (not shown) via path 694, and enables user-inputs to be provided to system 600 via a keypad.

Touch screen controller 660 generates display signals (e.g., in RGB format) to cause corresponding text or images (for example, in the form of a GUI) to be displayed on touch screen 110. Touch screen controller 660 receives touch signals generated by touch screen 110, in response to touch/pressure (in general, the touch operations) applied on touch screen 110. Touch screen controller 660 may process such touch signals and generate digital data representing the touch signals.

The generated digital data is passed to appropriate execution entities via the shared environment 625. For example, if a touch operation is performed with respect to a visual element controlled by a user application, the digital data is eventually delivered to the user application.

Touch screen 110 displays text/images, etc, defined by the display signals received from touch screen controller 660. Thus, touch screen 110 may display a GUI generated by an application executed by CPU 610. Touch screen 110 generates touch signals in response to touch operations using finger(s) or stylus, etc., with respect to a corresponding portion (for example a visual element) of touch screen 110. Touch screen controller 660 and touch screen 110 may be implemented in a known way.

In this document, the term "computer program product" is used to generally refer to removable storage unit or hard disk installed in a hard drive. These computer program products are means for providing software to digital processing system 600. CPU 610 may retrieve the software instructions, and execute the instructions to provide various features of the present disclosure described above.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of facilitating selection of elements displayed on a touch screen, the method comprising:

sending a plurality of elements for display as a part of a chart on said touch screen, each element being identified by a corresponding value of a first sequence of values in a first dimension and also another corresponding value of a second sequence of values in a second dimension, said first sequence of values and said second sequence of values being aligned respectively along a first axis and a second axis of said chart such that the position of each element in the displayed chart is correlated with the respective values in said first dimension and said second dimension identifying the element, wherein said chart is a graph, wherein said graph contains a respective group of elements of a plurality of groups of element associated with each value of said second sequence of values, each group of elements containing one or more elements having the same value in said second dimension;

receiving an indication that a user has selected a first element of said plurality of elements displayed on said touch screen, said first element being identified by a first value in said first dimension and a second value in said second dimension;

receiving information indicating that a user has performed a swipe in a direction on said touch screen after having selected said first element;

checking whether said direction is closer to said first axis or said second axis in the display of said chart on said touch screen;

if said direction is closer to said first axis than said second axis, determining as a desired element, a single element of said plurality of elements subsequent to said first element along said first dimension, otherwise determining as said desired element, another single element of said plurality of elements subsequent to said first element along said second dimension, said single element being identified by a third value in said first dimension and a fourth value in said second dimension; and updating said chart to indicate that said desired element is the only presently selected element among all of said plurality of elements displayed as said part of said chart, wherein all of said plurality of elements, including said first element, said single element, and said another single element, are displayed on said touch screen upon said sending, upon said updating, when said user selects said first element and when said user performs said swipe, wherein each of said plurality of elements, including said first element and said single element, is a corresponding graphic element displayed at the respective position defined by values in said first dimension and said second dimension while covering a respective display portion of said touch screen, and wherein said single element is in the same group of elements if said direction is closer to said first axis and in a different group of elements if said direction is closer to said second axis.

2. The method of claim 1, wherein said desired element is subsequent to said first element at a distance of a number of elements proportionate to the speed or length of said swipe.

3. The method of claim 1, wherein said desired element is only one element away from said first element along the determined one of said first dimension or said second dimension, irrespective of the speed or length of said swipe.

4. The method of claim 3, further comprising:
storing said plurality of elements in the form of a two dimensional array;
maintaining a first index for a first dimension and a second index for a second dimension of said two dimensional array,
wherein an element pointed by said first index and said second index represents a selected element, wherein said first index and said second index together are set to identify said first element upon receiving of said indication;
incrementing or decrementing said first index by 1 if said direction is closer to said first axis; and
incrementing or decrementing said second index by 1 if said direction is closer to said second axis,
wherein said updating is performed based on identification of specific element upon said first index or said second index being incremented or decremented.

5. The method of claim 4, wherein each of said plurality of elements is stored in a corresponding object of an array of objects, wherein each object stores attributes identifying a display portion to be covered by the corresponding element and also tooltip information of the element.

6. The method of claim 5, further comprising:
accessing a first object of said array of objects using said first index and said second index in response to said indication of selection of said first element; and
displaying a tooltip box and a leader line pointing to said first element, wherein the tooltip information stored in said first object is included in said tooltip box also in response to said indication of selection of said first element,
wherein said swipe is a drag operation of said tooltip box on said touch screen,
wherein said updating comprises pointing said leader line to said desired element and including in said tooltip box the tooltip information corresponding to said desired element.

7. A non-transitory machine readable medium storing one or more sequences of instructions for causing a touch system to facilitate selection of elements displayed on a touch screen, said touch screen being part of said touch system, wherein execution of said one or more sequences of instructions by one or more processors contained in said touch system causes said touch system to perform the actions of:

sending a plurality of elements for display as a part of a chart on said touch screen, each element being identified by a corresponding value of a first sequence of values in a first dimension and also another corresponding value of a second sequence of values in a second dimension, said first sequence of values and said second sequence of value being aligned respectively along a first axis and a second axis of said chart such that the position of each element in the displayed chart is correlated with the respective values in said first dimension and said second dimension identifying the element, wherein said chart is a graph, wherein said graph contains a respective group of elements of a plurality of groups of element associated with each value of said second sequence of values, each group of elements containing one or more elements having the same value in said second dimension;

receiving an indication that a user has selected a first element of said plurality of elements displayed on said touch screen, said first element being identified by a first value in said first dimension and a second value in said second dimension;

receiving information indicating that a user has performed a swipe in a direction on said touch screen after having selected said first element;

checking whether said direction is closer to said first axis or said second axis in the display of said chart on said touch screen;

if said direction is closer to said first axis than said second axis, determining as a desired element, a single element of said plurality of elements subsequent to said first element along said first dimension, otherwise determining as said desired element, another single element of said plurality of elements subsequent to said first element along said second dimension, said single element being identified by a third value in said first dimension and a fourth value in said second dimension; and updating said chart to indicate that said desired element is the only presently selected element among all of said plurality of elements displayed as said part of said chart, wherein all of said plurality of elements, including said first element, said single element, and said another single element, are displayed on said touch screen upon said sending, upon said updating, when said user selects said first element and when said user performs said swipe, wherein each of said plurality of elements, including said first element and said single element, is a corresponding graphic element displayed at the respective position defined by values in said first dimension and said second dimension while covering a respective display portion of said touch screen, and wherein said single element is in the same group of elements if said direction is closer to said first axis and in a different group of elements if said direction is closer to said second axis.

8. The machine readable medium of claim 7, wherein said desired element is subsequent to said first element at a distance of a number of elements proportionate to the speed or length of said swipe.

9. The machine readable medium of claim 7, wherein said desired element is only one element away from said first element along the determined one of said first dimension or said second dimension, irrespective of the speed or length of said swipe.

10. The machine readable medium of claim 9 further comprising:
storing said plurality of elements in the form of a two dimensional array;
maintaining a first index for a first dimension and a second index for a second dimension of said two dimensional array,
wherein an element pointed by said first index and said second index represents a selected element, wherein said first index and said second index together are set to identify said first element upon receiving of said indication;
incrementing or decrementing said first index by 8 if said direction is closer to said first axis; and
incrementing or decrementing said second index by 8 if said direction is closer to said second axis
wherein said updating is performed based on identification of specific element upon said first index or said second index being incremented or decremented.

11. The machine readable medium of claim 10, wherein each of said plurality of elements is stored in a corresponding object of an array of objects, wherein each object stores attributes identifying a display portion to be covered by the corresponding element and also tooltip information of the element.

12. The machine readable medium of claim 11, further comprising:
accessing a first object of said array of objects using said first index and said second index in response to said indication of selection of said first element; and
displaying a tooltip box and a leader line pointing to said first element, wherein the tooltip information stored in said first object is included in said tooltip box also in response to said indication of selection of said first element,
wherein said swipe is a drag operation of said tooltip box on said touch screen,
wherein said updating comprises pointing said leader line to said desired element and including in said tooltip box the tooltip information corresponding to said desired element.

13. A digital processing system comprising:
a touch screen;
a memory for storing instructions;
a processing unit to retrieve instructions from said memory and execute the retrieved instructions, wherein execution of said instructions by said processing unit causes said digital processing system to perform the actions of:
sending a plurality of elements for display as a part of a chart on said touch screen, each element being identified by a corresponding value of a first sequence of values in a first dimension and also another corresponding value of a second sequence of values in a second dimension, said first sequence of values and said second sequence of value being aligned respectively along a first axis and a second axis of said chart such that the position of each element in the displayed chart is correlated with the respective values in said first dimension and said second dimension identifying the element,
wherein said chart is a graph, wherein said graph contains a respective group of elements of a plurality of groups of element associated with each value of said second sequence of values, each group of elements containing one or more elements having the same value in said second dimension;
receiving an indication that a user has selected a first element of said plurality of elements displayed on said touch screen, said first element being identified by a first value in said first dimension and a second value in said second dimension;
receiving information indicating that a user has performed a swipe in a direction on said touch screen after having selected said first element;
checking whether said direction is closer to said first axis or said second axis in the display of said chart on said touch screen;
if said direction is closer to said first axis than said second axis, determining as a desired element, a single element of said plurality of elements subsequent to said first element along said first dimension, otherwise determining as said desired element, another single element of said plurality of elements subsequent to said first element along said second dimension, said single element being identified by a third value in said first dimension and a fourth value in said second dimension; and
updating said chart to indicate that said desired element is the only presently selected element among all of said plurality of elements displayed as said part of said chart,
wherein all of said plurality of elements, including said first element, said single element, and said another single element, are displayed on said touch screen upon said sending, upon said updating, when said user selects said first element and when said user performs said swipe,
wherein each of said plurality of elements, including said first element and said single element, is a corresponding graphic element displayed at the respective position defined by values in said first dimension and said second dimension while covering a respective display portion of said touch screen, and
wherein said single element is in the same group of elements if said direction is closer to said first axis and in a different group of elements if said direction is closer to said second axis.

14. The digital processing system of claim 13, wherein said desired element is subsequent to said first element at a distance of a number of elements proportionate to the speed or length of said swipe.

15. The digital processing system of claim 13, wherein said desired element is only one element away from said first element along the determined one of said first dimension or said second dimension, irrespective of the speed or length of said swipe.

16. The digital processing system of claim 15, wherein said actions further comprising:
storing said plurality of elements in the form of a two dimensional array;
maintaining a first index for a first dimension and a second index for a second dimension of said two dimensional array,
wherein an element pointed by said first index and said second index represents a selected element, wherein said first index and said second index together are set to identify said first element upon receiving of said indication;

incrementing or decrementing said first index by 1 if said direction is closer to said first axis; and incrementing or decrementing said second index by 1 if said direction is closer to said second axis wherein said updating is performed based on identification of specific element upon said first index or said second index being incremented or decremented.

17. The digital processing system of claim 16, wherein each of said plurality of elements is stored in a corresponding object of an array of objects, wherein each object stores attributes identifying a display portion to be covered by the corresponding element and also tooltip information of the element.

18. The digital processing system of claim 17, wherein said action further comprising:

accessing a first object of said array of objects using said first index and said second index in response to said indication of selection of said first element; and displaying a tooltip box and a leader line pointing to said first element, wherein the tooltip information stored in said first object is included in said tooltip box also in response to said indication of selection of said first element, wherein said updating comprises pointing said leader line to said desired element and including in said tooltip box the tooltip information corresponding to said desired element, and wherein said swipe is a drag operation of said tooltip box on said touch screen, and said chart is a graph.

* * * * *

UNITED STATES PATENT AND TRADEMARK OFFICE
CERTIFICATE OF CORRECTION

PATENT NO. : 9,733,785 B2
APPLICATION NO. : 14/097261
DATED : August 15, 2017
INVENTOR(S) : Kapahi It is certified that error appears in the above-identified patent and that said Letters Patent is hereby corrected as shown below:

In the Specification

In Column 1, Line 27, delete "UNNASSIGNED," and insert -- UNASSIGNED, --, therefor.

In Column 1, Line 31, delete "UNNASSIGNED," and insert -- UNASSIGNED, --, therefor.

In Column 1, Lines 34-35, delete "UNNASSIGNED," and insert -- UNASSIGNED, --, therefor.

In Column 2, Lines 26-27, after "information" insert -- . --.

In Column 7, Line 54, after "Y-axis" insert -- . --.

Signed and Sealed this
Twenty-ninth Day of May, 2018

Andrei Iancu
*Director of the United States Patent and Trademark Office*